(12) United States Patent
Sedillo

(10) Patent No.: US 11,571,286 B2
(45) Date of Patent: Feb. 7, 2023

(54) APPARATUS FOR TOOTH STAIN REMOVAL

(71) Applicant: Kreigh Sedillo, Visalia, CA (US)

(72) Inventor: Kreigh Sedillo, Visalia, CA (US)

(*) Notice: Subject to any disclaimer, the term of this patent is extended or adjusted under 35 U.S.C. 154(b) by 347 days.

(21) Appl. No.: 16/705,104

(22) Filed: Dec. 5, 2019

(65) Prior Publication Data

US 2020/0107917 A1  Apr. 9, 2020

Related U.S. Application Data

(63) Continuation-in-part of application No. 14/861,956, filed on Sep. 22, 2015, now abandoned.

(51) Int. Cl.
*A61C 17/18* (2006.01)
*A61C 1/06* (2006.01)

(52) U.S. Cl.
CPC .............. *A61C 17/18* (2019.05); *A61C 1/06* (2013.01)

(58) Field of Classification Search
CPC ......... A61C 17/18; A61C 17/20; A61C 17/16; A61C 1/06–07; A61C 15/047; A61C 15/00; A61B 17/16–1604; A61B 17/1659; A61B 2017/320074; A61B 2017/320075; A61B 2017/320072
See application file for complete search history.

(56) References Cited

U.S. PATENT DOCUMENTS

| | | | | |
|---|---|---|---|---|
| 1,624,054 A | * | 4/1927 | Kuhne | A61C 15/00 132/329 |
| 5,324,299 A | * | 6/1994 | Davison | A61B 17/320068 606/167 |
| 5,974,615 A | * | 11/1999 | Schwarz-Hartmann | A61C 17/3472 15/22.4 |
| 6,254,622 B1 | * | 7/2001 | Hood | A61B 17/320068 606/169 |
| 8,814,870 B2 | * | 8/2014 | Paraschiv | A61B 17/142 606/79 |
| 2007/0190485 A1 | * | 8/2007 | Hayman | A61C 3/00 433/118 |
| 2008/0096163 A1 | * | 4/2008 | Buchanan | A61C 17/20 433/119 |
| 2015/0230800 A1 | * | 8/2015 | Griego | A61B 17/068 606/143 |

FOREIGN PATENT DOCUMENTS

DE  102007024809 A1 * 11/2008 ............. A61C 1/144

* cited by examiner

*Primary Examiner* — Jacqueline T Johanas
*Assistant Examiner* — Shannel Nicole Belk
(74) *Attorney, Agent, or Firm* — J. Curtis Edmondson; Cotman IP Law

(57) ABSTRACT

An apparatus for tooth stain removal is presented. The invention comprises a powered device with a chisel tip at its distal end, a body at its proximal end and an electric motor housed within the body for driving the chisel tip. The chisel tip has a proximal end removably coupled to the body and an exposed distal end along a generally longitudinal axis. The chisel tip comprises a pointed end on a first side for cleaning area between teeth and a broad cleaning surface on a second side for cleaning the main surface of each tooth. The chisel tip operates in a reciprocating motion driven by the electric motor. The reciprocating motion repeatedly moves the chisel tip in a back and forth direction by a finite displacement along the chisel tip's longitudinal axis.

13 Claims, 6 Drawing Sheets

APPARATUS FOR TOOTH STAIN REMOVAL

CROSS-REFERENCE TO RELATED APPLICATIONS

The present application is a continuation-in-part of U.S. application Ser. No. 14/861,956, filed on Sep. 22, 2015, specification of which is hereby incorporated by reference in its entirety.

BACKGROUND OF THE INVENTION

Field of the Invention

Embodiments of the invention relates to the field of dental tools. More specifically, the invention relates to an apparatus for removing stain from a tooth.

Description of the Related Art

Teeth stain removal tools are generally dental hygienic tools with a pointed and rounded tip or brush type tips used by dentists or dental hygienists. The devices with pointed and rounded tips, referred to as scalers, are used by dental hygienists to remove calculus and other material from the surface of the teeth. The process of using a scaler to remove calculus and other material from the surface of the teeth is referred to as scaling.

Powered scaling tools are in the form of ultrasonic and sonic scalers. Dental professionals use sonic scalers to clean plaque, tartar and other hard deposits from the teeth of patients. Sonic and ultrasonic scalers include a rapidly vibrating pointed and rounded tip that is either driven by compressed air or by an electric motor. The tip rapidly vibrates to aid in removing deposits from the tooth surfaces. The shape of the tip is often pointed and hook shaped to assist the user in reaching hard to reach locations between the teeth.

BRIEF SUMMARY OF THE INVENTION

One or more embodiments of the invention are directed an apparatus for removing stain from a tooth. The invention comprises a powered device with a chisel tip at its distal end, a portable base unit at its proximal end and an electric motor housed within the base unit for driving the chisel tip.

In one or more embodiments, the base unit comprises a housing and a cover for securing an electric motor and other power components within the housing. The distal end of the housing comprises a head with mouth. The mouth is preferably an orifice that extends from the distal end of housing to approximately the electric motor.

In one or more embodiments, the mouth comprises an upper lip and lower lip. Each of the upper and lower lips includes a ridge on the inside surface that together acts as a retaining clip for securing the chisel tip to the housing. In one or more embodiments, while secured to the housing, the chisel tip and body combination are configured to allow finite linear motions of the chisel tip in the longitudinal axis that are decoupled from the housing.

The base unit may further comprise one or more batteries as part of the power components. The batteries may be rechargeable and the base unit may be configured to couple to a battery charging source, e.g. an AC outlet.

The chisel tip has a proximal end removably coupled to the body through the mouth, and an exposed distal end along a generally longitudinal axis. The proximal end of the chisel tip includes a groove with which the ridges act to secure the chisel tip to the body.

In one or more embodiments, the chisel tip comprises a pointed end on a first side for removing stains in the area between teeth and a broad cleaning surface on a second side for removing stains from the main surface of each tooth. In one or more embodiments, the pointed end on the first side is curved at an approximately 90 degrees angle from the longitudinal axis to enable stain removal in hard to reach surfaces between teeth.

The chisel tip operates in a reciprocating motion driven by the electric motor. The reciprocating motion repeatedly moves the chisel tip in a back and forth direction by a finite displacement along the chisel tip's longitudinal axis.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

Figure 1:
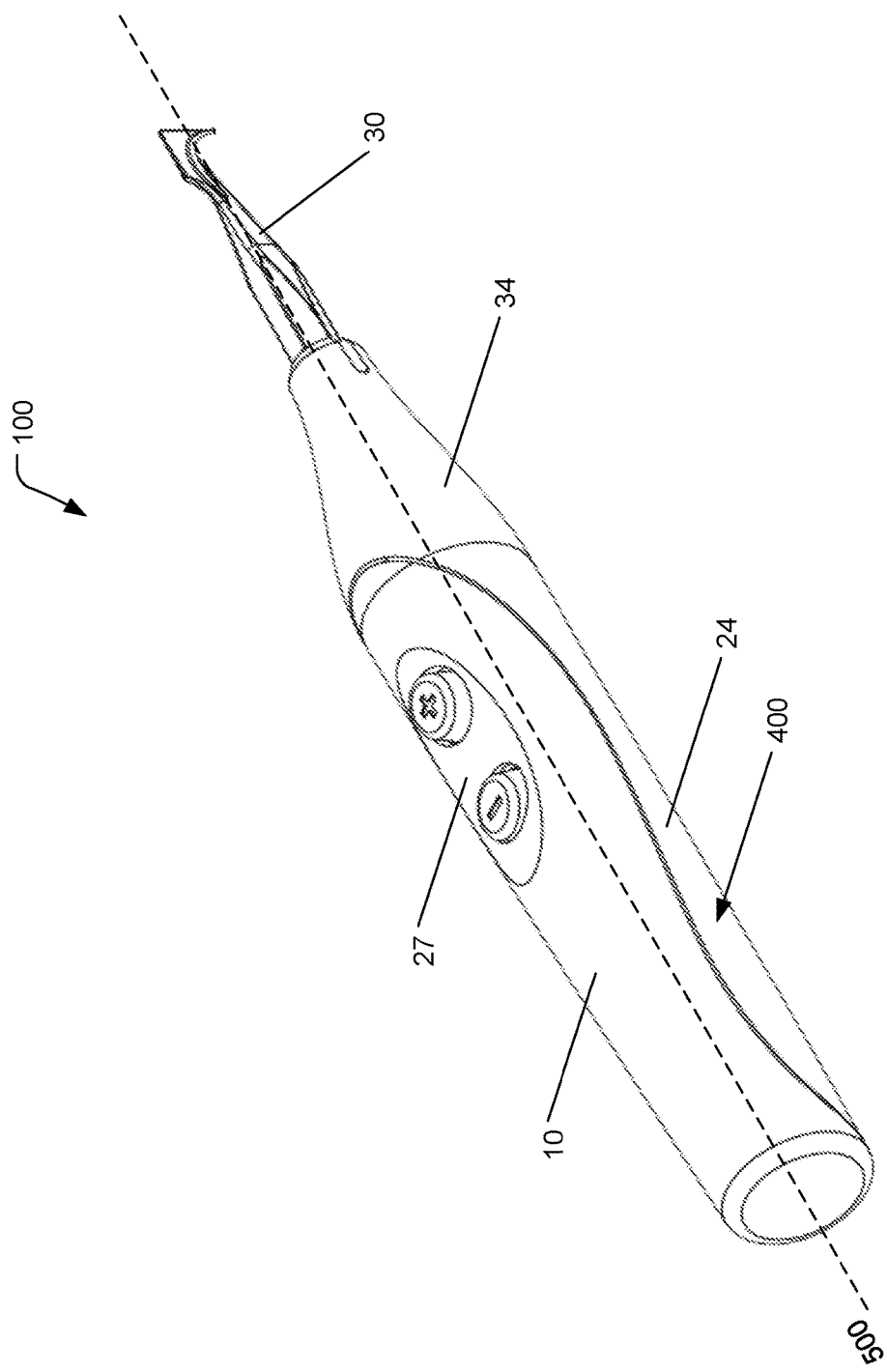
FIG. 1 is an illustration of a perspective view of a tooth stain removal device in accordance with one or more embodiments of the present invention.
Figure 2:
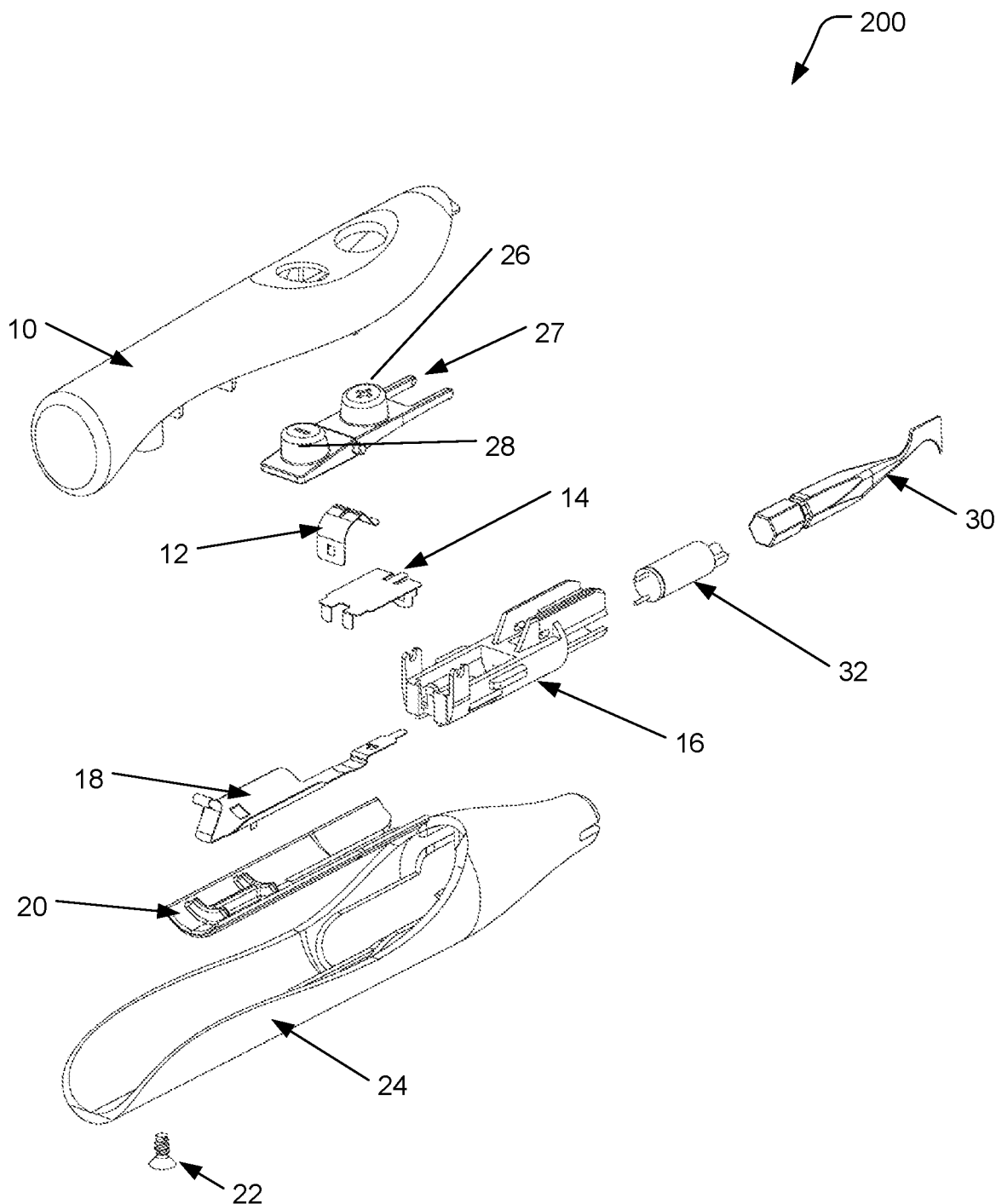
FIG. 2 is an illustration of an exploded view of the tooth stain removal device in accordance with one or more embodiments of the present invention.

The present invention comprising an apparatus for removal of stain from a tooth will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Furthermore, specific features, quantities, or measurements well known to those of ordinary skill in the art have not been described in detail so as not to obscure the invention. It should be noted that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term "first", "second" and the like, herein do not denote any order, quantity or importance, but rather are used to distinguish one element from another, and the terms "a" and "an" herein do not denote a limitation of quantity, but rather denote the presence of at least one of the referenced item.

One or more embodiments of the present invention will now be described with references to FIGS. 1-4B.

As illustrated, one or more embodiments of the apparatus 100 for tooth stain removal comprise a body (or base unit) 400. Body 400 comprises housing 24; cover 10, shoulder 34 and power button assembly 27. Shoulder 34 of body 400 includes a head with mouth 38. Mouth 38 is preferably an orifice that extends from the distal end of body 400 to approximately the DC motor 32 and comprises an upper lip 36 and a lower lip 37. Each lip, e.g. 36 and 37, may include a section of a retaining clip, e.g. surface 39, for securing the chisel tip 30 at groove 308.

In one or more embodiments, body 400 is preferably made of thermoplastic material, e.g. polycarbonate, polystyrene, ABS, polyethylene, polypropylene, polyvinylchloride, or similar type material. Those of skill in the arts would appreciate that other materials, e.g. composites, are contemplated without deviating from the spirit of the invention.

Housing 24 is configured to hold a power source, e.g. at least one battery (not shown), in battery holder 16. Housing 24 further comprises battery contacts 12, 14 and 18 and battery support structure 20. The battery could be one or more AA, AAA, C, or D sized batteries, for example. Those of skill in the arts would appreciate that other types and sizes of batteries are contemplated without deviating from the spirit of the invention.

In one or more embodiments, the at least one battery is coupled to DC motor 32 through battery holder 16. DC motor 32 is preferably a vibrating motor with linear motions along the longitudinal axis 500, e.g. a linear DC motor. The DC motor may operate at frequencies between 100 Hz and 15 KHz. In a preferred embodiment, the DC Motor operates at a frequency of approximately 165 Hz.

In one or more embodiments, housing 24 is further configured to hold power button assembly 27, which comprises one or more switches for operating motor 32. For example, power button assembly 27 may be used to turn motor 32 either ON or OFF. In the illustrated example, power button assembly 27 comprises ON button 26 and OFF button 28. However, it should be apparent to those of skill in the arts that a single button may be used for the ON/OFF function.

Also, in one or more embodiments, a dual button configuration, e.g. buttons 26 and 28, may provide additional functions such as for adjusting the motor frequency, etc. For instance, the ON button 26 (with a + sign) may be used to turn on the motor when momentarily depressed and to increase the motor frequency when repeatedly or continually depressed after the motor is turned on. The OFF button 28 (with a − sign) may be used to turn off the motor when momentarily depressed and to decrease the motor frequency when continually depressed after the motor is turned on. Those of skill in the art would appreciate that other configurations and functions of the power button assembly may be provided without deviating from the spirit of the invention.

In one or more embodiments, cover 10 is removably coupled to housing 24 to secure the battery assembly, power button assembly, and motor within the housing. Cover 10 may be secured to housing 24 with retaining screw 22, as illustrated. However, those of skill in the arts would appreciate that other means of securing cover 10 to housing 24 may be employed without deviating from the invention. For instance, a spring loaded or a manual mechanical latch may be used to accomplish the same function of securing the cover, i.e. 10, to the housing 24.

As illustrated, one or more embodiments of the apparatus 100 for tooth stain removal comprise a chisel tip 30 removably coupled to a body 400. Chisel tip 30 comprises a proximal section 306 and a distal section (i.e. region above section 306) with a flat distal end and a pointed tip 302 on the front side of the flat distal end. The outside perimeter of the proximal section 306 of chisel tip 30 is shaped to prevent rotational slippage about the longitudinal axis 500 during operation when coupled with body 400. For instance, the outside perimeter could be shaped like a hexagon, like a square, triangle, etc. Those of skill in the arts would appreciate that other shapes are possible, including cylindrical, etc. so long as there is sufficient or other structure (e.g. a pin) provided to prevent rotational slippage of the chisel tip about the longitudinal axis.

Proximal section 306 of chisel tip 30 may further include a groove 308 for a retaining ring or clip type device. The retaining ring or clip type device may be located inside the mouth 38 of body 400 for securing the chisel tip 30 to the body 400 and prevent unintentional linear movement in the longitudinal axis 500 (i.e. vertical direction) during operation. The chisel tip, when secured to the body, may be configured to allow a predetermined maximum displacement along the longitudinal axis.

Figures 3A, 3B:
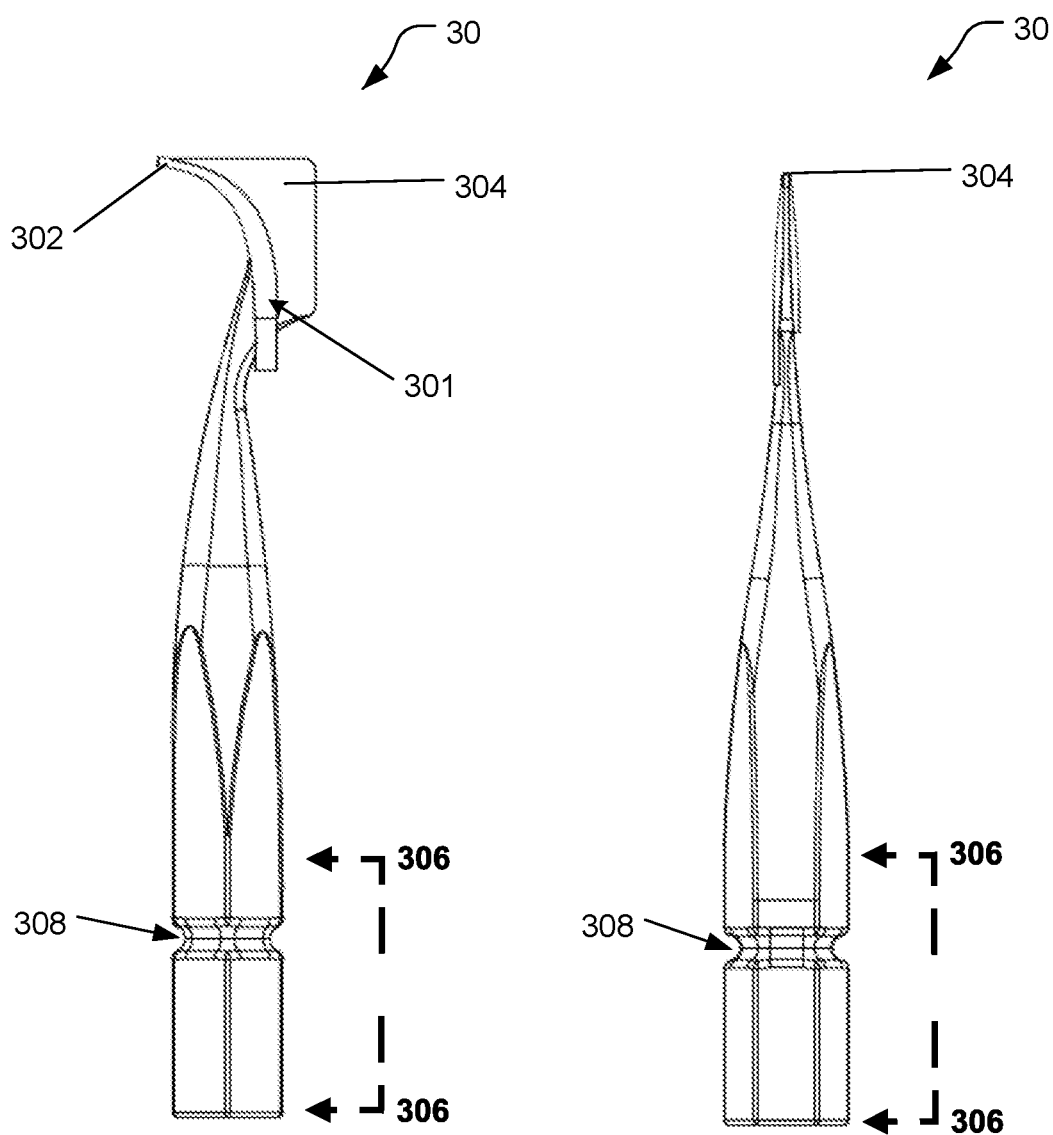
FIG. 3A is an illustration of left or right side view of the chisel tip of the tooth stain removal device in accordance with one or more embodiments of the present invention.
FIG. 3B is an illustration of back side view of the chisel tip of the tooth stain removal device in accordance with one or more embodiments of the present invention.
Figure 3C:
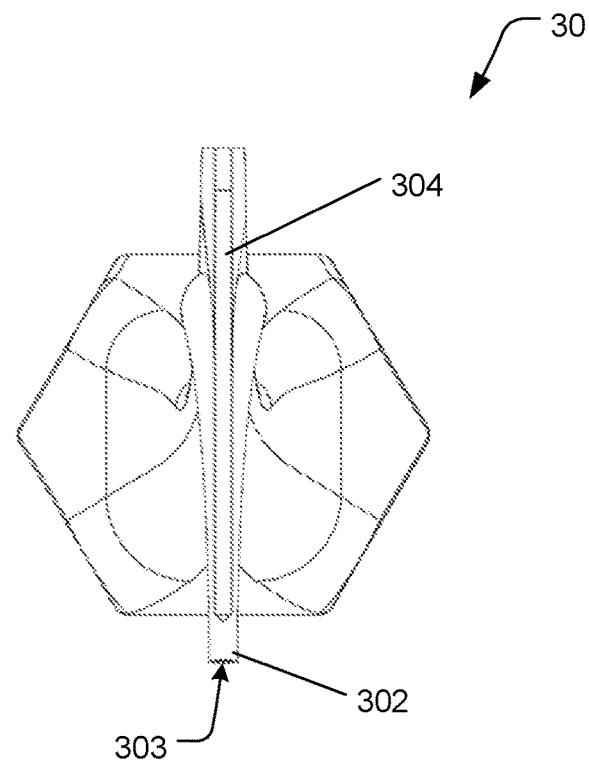
FIG. 3C is an illustration of top side view of the chisel tip of the tooth stain removal device in accordance with one or more embodiments of the present invention.
Figure 3D:
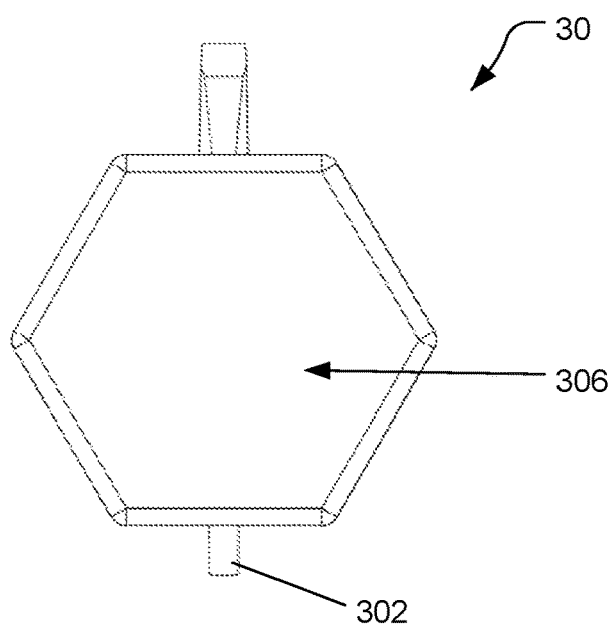
FIG. 3D is an illustration of bottom side view of the chisel tip of the tooth stain removal device in accordance with one or more embodiments of the present invention.
Figure 3E:
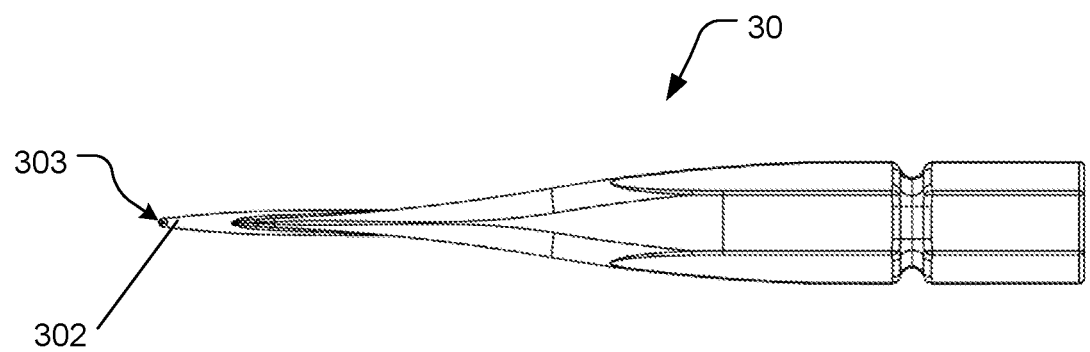
FIG. 3E is an illustration of front side view of the chisel tip of the tooth stain removal device in accordance with one or more embodiments of the present invention.
Figure 3F:
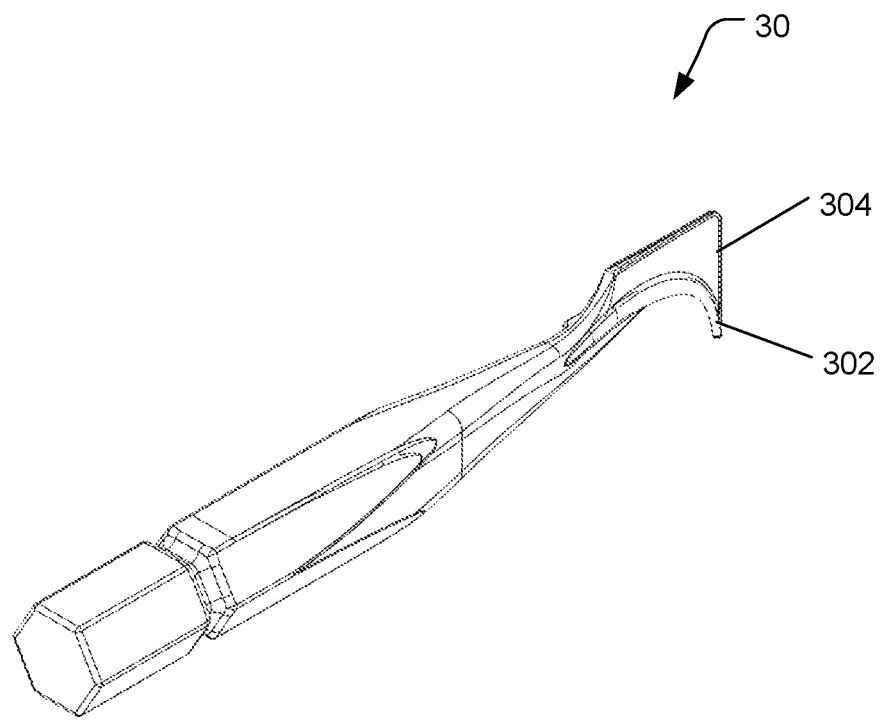
FIG. 3F is an illustration of a perspective view of the chisel tip of the tooth stain removal device in accordance with one or more embodiments of the present invention.
Figure 4A:
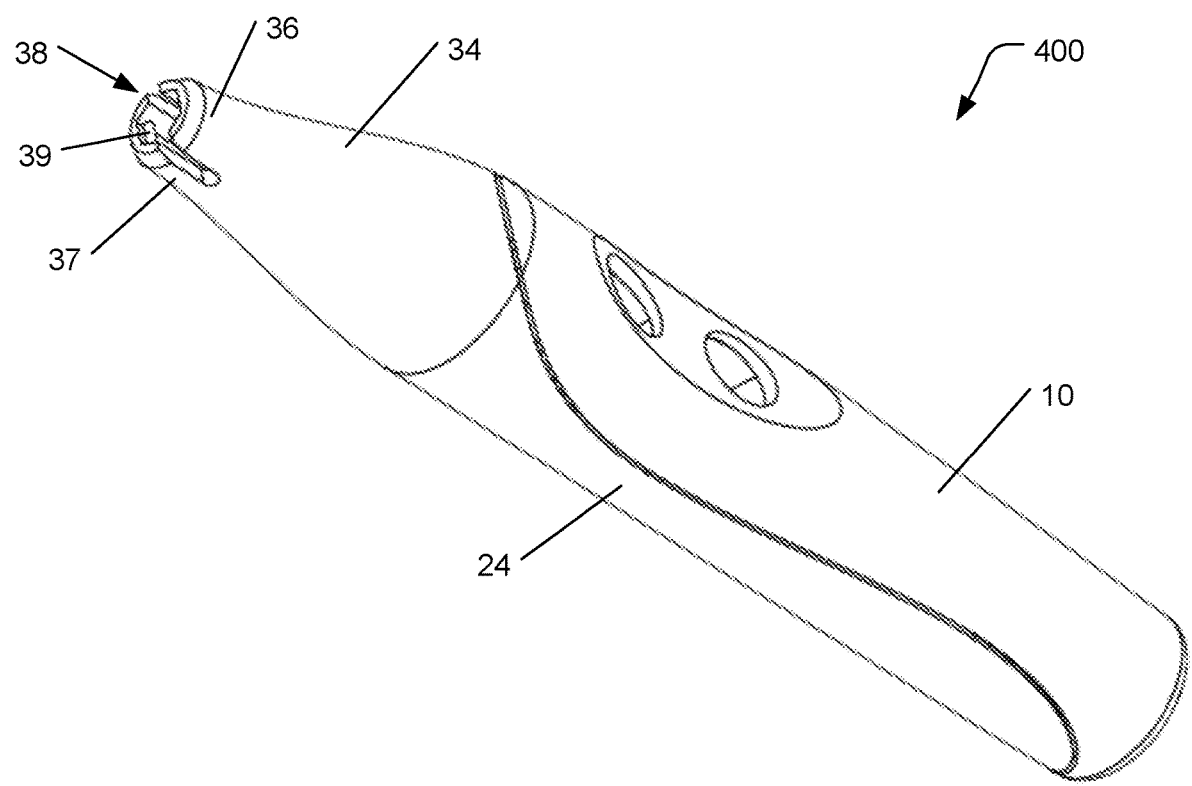
FIG. 4A is an illustration of a perspective view of the body of the tooth stain removal device in accordance with one or more embodiments of the present invention.
Figure 4B:
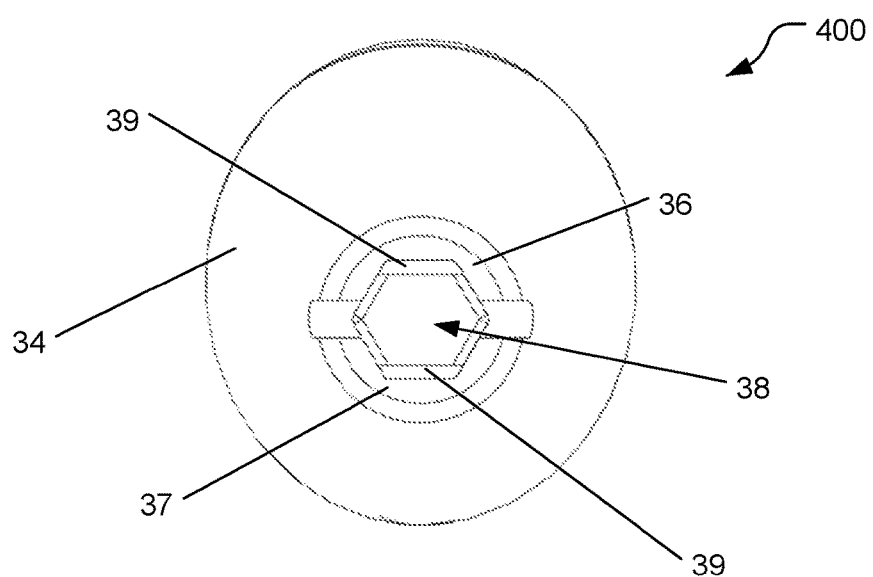
FIG. 4B is an illustration of top side view of the body of the tooth stain removal device in accordance with one or more embodiments of the present invention.

The distal section of the chisel tip 30 comprises a pointed tip 302 in the front side of the distal end. As illustrated in FIG. 3A, the pointed tip (or protrusion) 302 begins as a larger base that is substantially cylindrical in shape at its proximal section parallel to the longitudinal axis, 301, and tappers to a smaller diameter cylinder at the front end, i.e. 302, which protrudes out at an angle approximately 90 degrees from the longitudinal axis and configured to get between teeth for removing stains in the area between teeth. As further illustrated in FIGS. 3C-E, the pointed tip (or protrusion), 302, is substantially cylindrical and may be configured with an opening 303 for insertion of a disposable cleaning tip or device (not shown). The distal section of chisel tip 30 further comprises a broad cleaning surface 304 on each of the left and right sides of the distal end for removing stains on the main surface of a tooth. As illustrated in FIG. 3B, the distal section tappers into a flat distal end with broad cleaning surface 304 on the left and right sides.

The chisel tip is preferably made of stainless steel. Those of skill in the arts would appreciate that other materials are contemplated, e.g., titanium, aluminum, etc. without deviating from the spirit of the invention.

The proximal section 306 of Chisel tip 30 is coupleable with the distal end of body 400 (i.e. the head) through mouth 38. As illustrated, the lips, i.e. 36 and 37, each include a ridge 39 on the inside surface that together acts as a retaining clip for securing the chisel tip at groove 308 when the chisel tip 30 is inserted into the mouth 38 of the body 400. In one or more embodiments, groove 308 is slightly wider than ridge 39, i.e. creating a play between the ridge and the groove, such that finite linear displacements of chisel tip 30 is possible without disengaging the chisel tip from the body. Thus, the ridge and groove combination serves to prevent unintentional displacement of the chisel tip.

Chisel tip 30 is operationally engaged with motor 32, when coupled with body 400, such that the vibratory motions (i.e. linear motions) of the motor are transmitted directly to the chisel tip. In a preferred embodiment, the play between the groove 308 and ridge 39 is sufficient to isolate the housing from finite motions of the chisel tip so that only the chisel tip moves with the motor.

While the invention herein disclosed has been described by means of specific embodiments and applications thereof, numerous modifications and variations could be made thereto by those skilled in the art without departing from the scope of the invention set forth in the claims.

What is claimed is:

1. An apparatus for tooth stain removal comprising:
a portable hand-held base unit;
an electric motor emplaced within said base unit, wherein said electric motor generates linear motions along a longitudinal axis; and
a chisel tip movably coupled to a distal end of the base unit and coupled to said electric motor, wherein said linear motions are transmitted from the electric motor to the chisel tip causing a reciprocating motion of said chisel tip with respect to the base unit along said longitudinal axis, wherein said chisel tip comprises a proximal section with a groove configured to movably cooperate with a retaining clip, wherein the retaining clip is fixedly coupled to the base unit, wherein said groove comprises a width that defines maximum limits of said reciprocating motion, wherein the chisel tip further comprises a distal section having a crescent shaped edge with a rounded face terminating in a distal end with a cylindrical end with a protrusion which is pointed frustoconically on a front side with a thickness perpendicular to the longitudinal axis, wherein the thickness decreases from the proximate to the distal ends and a fin opposite said crescent shaped edge having a vertical substantially flat edge conjoined to a horizontal substantially flat edge via a 90-degree corner, wherein the horizontal substantially flat edge is linear and perpendicular to the longitudinal axis terminating to form the cylindrical end with the protrusion which is pointed such, wherein said fin comprises a broad cleaning surface on each of a left and right sides.

2. The apparatus of claim 1, wherein said electric motor is a linear DC motor.

3. The apparatus of claim 1, wherein said electric motor operates at a frequency of approximately 165 Hz.

4. The apparatus of claim 1, wherein said chisel tip comprises stainless steel material.

5. The apparatus of claim 1, wherein said cylindrical end with a protrusion which is pointed frustoconically is configured for removing stains in an area between teeth and said broad cleaning surface is configured for removing stains on a main surface of each tooth.

6. The apparatus of claim 5, wherein said cylindrical end with a protrusion which is pointed frustoconically being positioned at an approximately 90 degrees angle to the longitudinal axis to enable stain removal from a hard to reach tooth surface.

7. An apparatus for tooth stain removal comprising:
a portable hand-held base unit;
an electric motor emplaced within said base unit, wherein said electric motor generates vibratory linear motions along a longitudinal axis; and
a chisel tip movably coupled to a distal end of the base unit and coupled to said electric motor such that said vibratory linear motions are transmitted from the electric motor to the chisel tip causing a reciprocating motion of said chisel tip with respect to the base unit along said longitudinal axis, wherein said base unit is isolated from said reciprocating motions of said chisel tip, wherein said chisel tip comprises a proximal section with a groove configured to movably cooperate with a retainer, wherein said retainer is fixedly coupled to the base unit to allow said reciprocating motion of the chisel tip along the longitudinal axis, wherein the chisel tip further comprises a distal section having a crescent shaped edge with a rounded face terminating in a distal end with a a cylindrical end with a protrusion which is pointed frustoconically on a front side with a thickness perpendicular to the longitudinal axis, wherein the thickness decreases from the proximate to the distal ends and a fin opposite said crescent shaped edge having a vertical substantially flat edge conjoined to a horizontal substantially flat edge via a 90-degree corner, wherein said fin comprises a broad cleaning surface on each of a left and right sides.

8. The apparatus of claim 7, wherein said electric motor is a linear DC motor.

9. The apparatus of claim 7, wherein said electric motor operates at a frequency of approximately 165 Hz.

10. The apparatus of claim 7, wherein said chisel tip comprises stainless steel material.

11. The apparatus of claim 7, wherein said pointed protrusion is configured for removing stain from an area between teeth and said broad cleaning surface is configured for removing stains on a main surface of each tooth.

12. The apparatus of claim 11, wherein said pointed cylindrical protrusion is curved at an approximately 90 degrees angle from the longitudinal axis to enable stain removal from a hard to reach tooth surface.

13. The apparatus of claim 7, wherein said groove comprises a width that defines maximum limits of linear displacement of said chisel tip with respect to said base unit.

* * * * *